United States Patent [19]

McCauley

[11] 4,090,744
[45] May 23, 1978

[54] VEHICLE WHEEL DISC LOCKING MEANS

[76] Inventor: Lewis D. McCauley, 745 Le Brun Rd., Eggertsville, N.Y. 14226

[21] Appl. No.: 738,760

[22] Filed: Nov. 4, 1976

[51] Int. Cl.² .............................................. B60R 19/00
[52] U.S. Cl. ............................ 301/37 AT; 301/37 SS;
   248/503; 292/103
[58] Field of Search ................. 301/39 L, 38 R, 38 S,
   301/36 R, 36 WP, 37 AT, 37 SS, 37 SA, 108 R;
   70/259, 260; 24/221 R; 248/503; 85/9 R, 45;
   220/323-325, 57 R; 224/42, 25; 292/101, 103,
   202, 204

[56] References Cited

U.S. PATENT DOCUMENTS

| | | | |
|---|---|---|---|
| 1,400,364 | 12/1921 | Knapik | 85/9 R |
| 1,789,126 | 1/1931 | Aldeen | 85/9 R |
| 2,263,843 | 11/1941 | Gross | 220/324 |
| 2,282,222 | 5/1942 | Goeske | 301/37 AT |
| 3,608,970 | 9/1971 | Strumbos | 301/39 C |

*Primary Examiner*—Stanley H. Tollberg
*Assistant Examiner*—H. Grant Skaggs
*Attorney, Agent, or Firm*—Christel & Bean

[57] ABSTRACT

The disclosure shows an arrangement for locking wheel discs, wheel covers or hubcaps to vehicle wheels to prevent theft or accidental removal. The locking element consists of a rod or shaft member which extends through the wheel disc with a head formation at the outside of the wheel disc and a nut at the inside of the wheel disc for retaining the rod against axial movement while permitting rotation thereof. The inner end of the rod is bent more or less at right angles and in assembling the disc with respect to the wheel this terminal portion is disposed along a generally circumferential line with respect to the disc and the wheel and projects through an opening in the wheel proper. After the wheel disc is thus applied the locking rod is rotated so that its terminal inner end engages behind a portion of the web of the wheel structure to lock the disc to the wheel. A pair of diametrically opposite locking devices are employed so that the balance of the wheel is not disturbed and for more secure locking. The head of the locking rod is provided with an irregularly curving continuous groove which is engageable by a wrench having a flange formation which interfits with the groove to rotate the locking rod. Various sets of wheel disc locking members have varying curvatures in their head portions so that the wrench serves as a key for a given set of locking rods.

6 Claims, 4 Drawing Figures

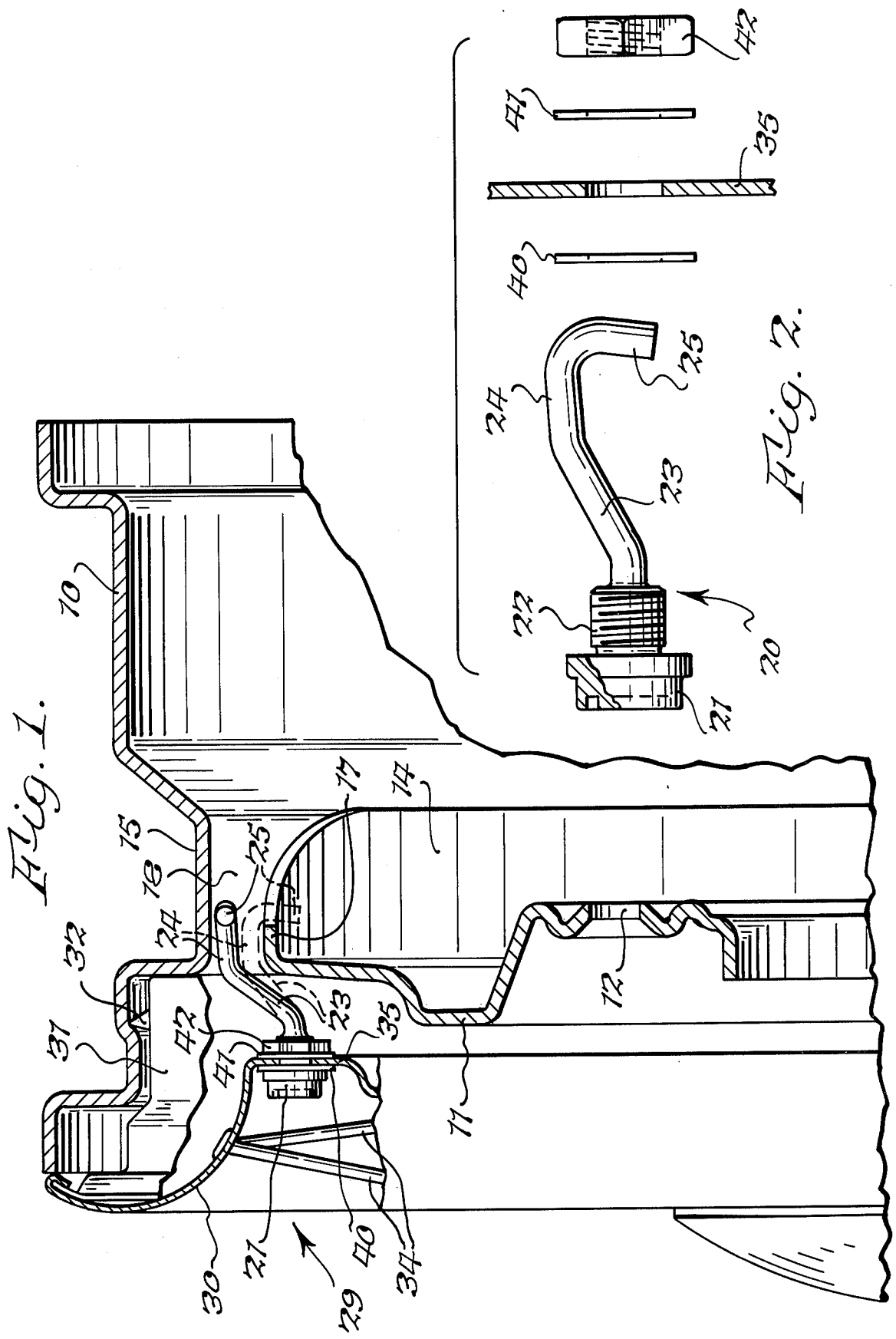

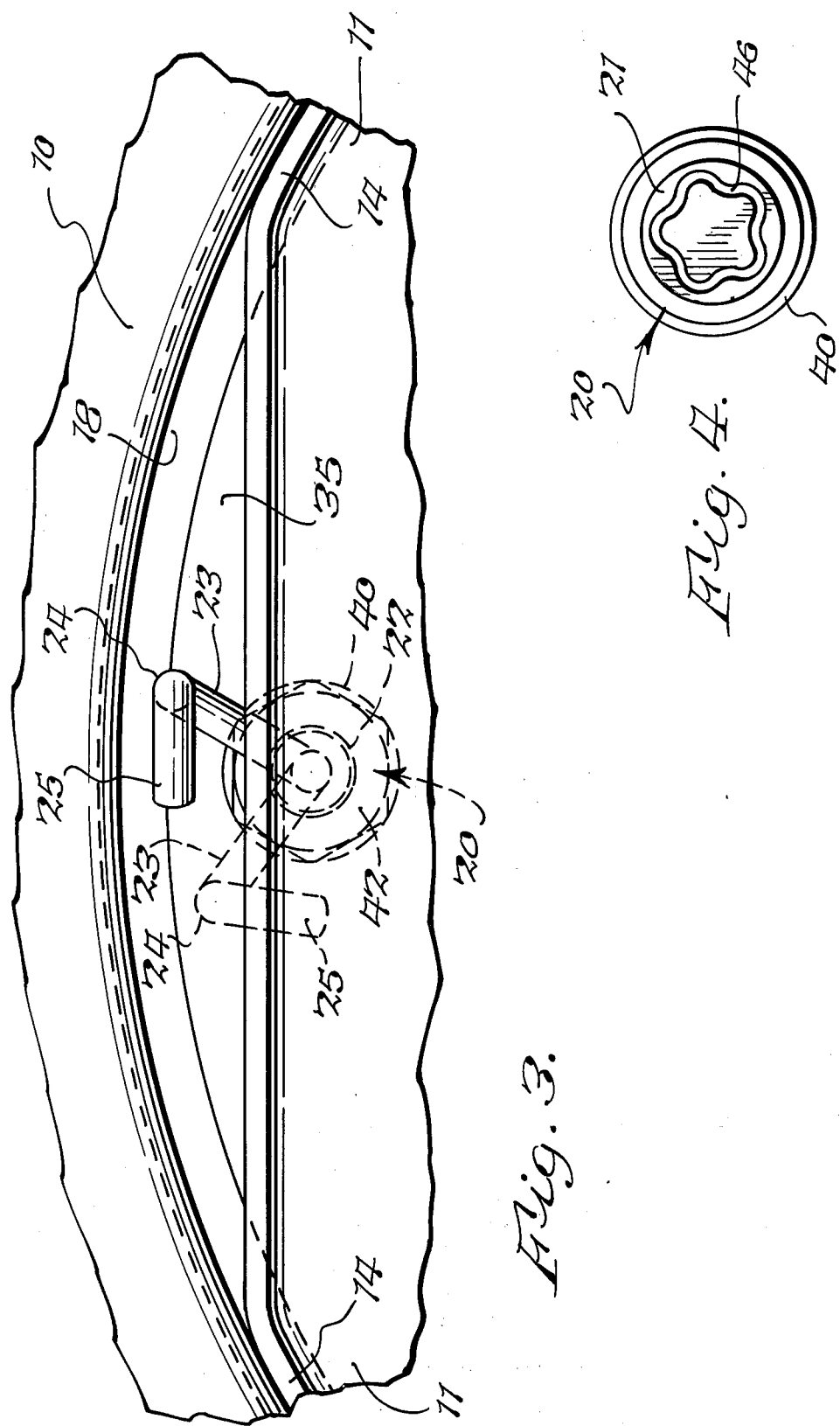

4,090,744

VEHICLE WHEEL DISC LOCKING MEANS

BACKGROUND OF THE INVENTION

This invention relates to vehicle wheel discs, wheel covers or hubcaps which are removably attached to the outer faces of vehicle wheels. The invention is concerned more particularly with means for preventing unauthorized or accidental removal of such trim discs, wheel covers or hubcaps from vehicle wheels.

Conventional automotive vehicle wheels are commonly equipped with hubcaps or similar trim discs or so-called wheel covers which are arranged to snap into place at the outer face of the vehicle wheel proper by use of resilient clips or the like and such hubcaps or trim discs are usually removed by merely prying them from the wheel with a tire iron, screw driver or the like.

Such hubcaps or trim discs have become increasingly elaborate and costly and theft of these devices is very common. Also, the spring clips sometimes break or the hubcap or wheel disc become disassociated from the wheel due to a severe bump or the like and the loss of the hubcap or disc in this manner is frequently not known at the time by the operator of the vehicle. Furthermore, removal of wheel discs in the conventional manner often results in theft of the entire wheel and tire.

SUMMARY OF THE INVENTION

The present invention relates to a relatively simple and very effective means for preventing unauthorized removal of a hubcap or wheel disc from an automotive vehicle wheel. Stated in its broadest terms the present invention provides locking elements in the form of rod or shaft means which extend through hubcaps or trim discs and are rotatably mounted therein.

The inner end of each such shaft includes an angularly extending terminal latch formation which is engageable with the vehicle wheel in locking relationship with respect thereto when the shaft is rotated a given amount. The mounting of each locking element in a wheel disc is such that it is held against axial movement with respect to the disc but is rotatable therein. The outer end of each such shaft device is provided with a head member having a key formation therein whereby the head may only be rotated by the use of a wrench element having the proper complementary key formations for interfitting with the head formations.

The secure locking of the wheel disc, wheel cover or hubcap to the wheel has the important additional advantage of preventing theft of the entire wheel and tire which is also a common occurrence.

BRIEF DESCRIPTION OF THE DRAWINGS

FIG. 1 is a fragmentary cross sectional view of the upper portion of a vehicle wheel equipped with one form of the locking device of the present invention;

FIG. 2 is a disassembled elevational view of the locking device per se viewed as in FIG. 1;

FIG. 3 is a fragmentary elevational view of a portion of the structure of FIG. 1 viewed from the inner side thereof, that is, from the right hand side of FIG. 1; and FIG. 4 is a face view of the head formation of the locking element.

DESCRIPTION OF THE ILLUSTRATED EMBODIMENT

FIG. 1 shows fragmentarily and in cross section the upper half of a vehicle wheel of the general type herein contemplated. In FIG. 1 the numeral 10 designates the tire receiving rim portion of a conventional steel vehicle wheel and the numeral 11 designates the web portion which extends generally radially inwardly from rim 10 for securement to the brake housing to which the wheel is attached by means of lug screws which extend through a circumferential series of openings 12 in web 11.

The outer edge of web 11 is provided with a circumferential flange 14 which is welded to the annular well formation 15 of rim 10. In the structure shown herein, by way of example, the flange 14 is not continuous in a circumferential direction but is interrupted at four points equally spaced about the circumference of the flange 14 by chordal flange portions 17 which provide segmental shaped openings between rim 10 and web 11 as indicated in FIG. 3.

In certain conventional steel vehicle wheel constructions these segmental openings 18 occur as an incident to the manufacture of the vehicle wheels entirely apart from considerations of the present invention but are availed of here for wheel disc locking purposes. In other wheel designs other points of engagement between the wheel disc locking means and the vehicle wheel proper may be specially provided for or availed of as conditions dictate.

As shown fragmentarily in FIG. 1 the wheel cover or wheel disc which is shown herein, by way of example, is designated generally by the reference numeral 29 and comprises an outer annular shell 30 and an inner annular shell 31. A series of resilient detents on inner shell 31 normally resiliently retain the wheel cover by engagement with portions of the wheel rim 10 as clearly shown in FIG. 1. The wheel cover is removed by simply prying the same from the wheel against the resilience of the detents 32 with a screw driver or the like. In the present instance the wheel cover is of the spoked type which is now popularly employed, a pair of the circumferential series of spokes being indicated at 34 in FIG. 1.

The outer shell 30 of the present wheel cover 29 incidentally includes a flat annular band portion 35 and advantage is taken of this band formation as a convenient mounting for the locking means of the present invention.

All of the structure thus far described is conventional in certain vehicle wheel structures and is well known in the automotive art. The wheel disc locking means of the present invention will now be described. The principal element of the present locking device is a so-called J-hook designated generally by the numeral 20 which in the present instance comprises a head formation 21, a threaded portion 22 adjacent thereto, and a shank portion which includes an offset portion 23, a straight portion 24 parallel to the axis of head formation 21, and a terminal portion 25 which is at approximately right angles to portion 24. FIGS. 2 and 3 which illustrate the J-hook in detail are enlarged views about twice the size of FIG. 1.

In the present embodiment of the invention the J-hook 20 is passed through the opening provided therefor in annular band 35 of the wheel disc and the means for retaining the J-hook locking element against axial movement relative to band 35 comprises Nylon washers 40 and 41 at the outer and inner sides of band 35 and a nut 42 which is applied to the threaded portion 22 of the J-hook which also extends through the wheel disc opening. The latter is thus permanently retained with respect to the outer shell 30 of the wheel disc although it may be removed if circumstances require by releasing nut 42.

As shown in FIG. 4, the head formation 21 of J-hook 20 has in its outer face a continuous curvilinear groove 46 which is engageable by a wrench member having an axially projecting flange which is complementary to and fits within groove 46. The grooves of various sets of the locking members vary in curvature and in effect the wrench members comprise keys for various sets of J-hook head formations. This much of the J-hook rotating arrangement is generally as shown in my prior U.S. Pat. No. 3,241,408 dated Mar. 22, 1966 which also illustrates the complementary wrench member.

While only the upper half of a vehicle wheel is illustrated in FIG. 1, it is to be understood that the wheel disc locks of the present invention are normally applied at diametrically opposite points of a wheel disc so that there will ordinarily be two locks per wheel. By this means the wheel locks automatically balance each other so that no condition of wheel imbalance is created. Furthermore, under certain conditions the use of a single wheel lock may not provide adequate security against removal although there may be some instances in which a single wheel lock might be employable with useful results.

When a wheel disc is to be applied to a vehicle wheel the two J-hooks carried thereby are rotated, by means of the key wrench described above, to a position wherein the terminal portions 25 thereof register with the wheel opening so that they pass freely therethrough. With a wheel such as illustrated herein the terminal portions 25 lie generally along an arc struck from the center of the wheel as illustrated in full lines in FIGS. 1 and 2. With the J-hooks in this position the wheel disc or wheel cover 29 may be assembled upon the wheel proper in the usual manner with the terminal portions 25 of the J-hooks passing freely through the openings 18.

The aforementioned wrench is then employed to rotate each J-hook in a clockwise direction (counterclockwise as viewed in FIG. 3 which is from the inside of the wheel). This rotation engages the terminal end portion 25 of each J-hook behind the flange 17 of the web member 11 of the vehicle wheel as shown in dot-and-dash lines in FIGS. 1 and 3.

In order to avoid the possibility of releasing the J-hook by applying a screwdriver or similar instrument to the groove in the head thereof, it is desired that a substantial torque be required in the releasing operation. Accordingly, in applying the J-hooks to the wheel discs each nut 42 is tightened with a torque wrench. A torque setting of 85 to 90 pound inches may be employed. Thus, the Nylon washers 40 and 41 are securely gripped in an axial direction and impose sufficient frictional resistance to rotation of the J-hooks by means other than the proper key wrench.

In the example illustrated in the drawings, by way of example, the off-set portion 23 of the J-hook 20 is provided to adapt the J-hook to a particular wheel and wheel cover installation wherein the flange 17 of the web 11 of the wheel structure is disposed radially outwardly of the center of the band 35 of wheel cover 29.

Where conditions permit, the shank portion of the J-hook may extend straight inwardly from the head 21 to the terminal wheel engaging portion 25 or may be otherwise offset.

The terms "wheel disc", "wheel cover" and "hubcap" are used interchangeably in the foregoing description and it is to be understood that the claims are intended to embrace any of these devices which are applied to the outer sides of vehicle wheels. A preferred embodiment of this invention having been hereinabove described and illustrated in the drawings, it is to be understood that numerous modifications thereof can be made without departing from the broad spirit and scope of this invention as defined in the appended claims.

I claim:

1. For use in combination with a vehicle wheel having a wheel cover disc applied exteriorly thereto, disc locking means comprising a locking element comprising a shank portion and a head formation at the outer end thereof, said shank portion extending through an opening in said disc, said locking element having a threaded portion between said head formation and said shank portion which threaded portion projects through the shank receiving opening of said disc, and nut means at the inner side of said disc for engagement with said threaded portion to retain the locking element against axial movement while permitting rotation thereof, said shank portion having an angular terminal portion adapted in one rotative position to pass through an opening in said wheel and, upon rotation from said position, to engage behind a portion of said wheel adjacent to said opening to prevent disassembly of said disc from said wheel, said head formation being formed to receive a key wrench whereby the locking element may be rotated only by means of the key wrench.

2. Wheel disc locking means according to claim 1 wherein said locking element head formation has an irregular curvilinear groove in its outer face for cooperation with a wrench having a flange formation adapted to fit within said groove for rotation of said locking element.

3. Wheel disc locking means according to claim 1 wherein said locking element includes frictional rotation-restraining means whereby substantial torque is required to rotate said locking element between locked and unlocked positions.

4. Wheel disc locking means according to claim 1 wherein an inner portion of said locking element shank portion is axially offset from the head formation to compensate for differences in radial location as between the locking element axis and said wheel opening.

5. Wheel disc locking means according to claim 1 including non-metallic washer means between said head formation and said nut and bearing against at least one side of said disc to impose limited frictional resistance to rotation of said locking means.

6. Wheel disc locking means according to claim 1 including means acting between said locking element and said disc to impose limited frictional resistance to rotation of said locking means.

* * * * *